Patented May 8, 1923.

1,454,521

UNITED STATES PATENT OFFICE.

EARL C. SHERRARD, OF MADISON, WISCONSIN, DEDICATED, BY MESNE ASSIGNMENTS, TO THE PEOPLE OF THE UNITED STATES.

PROCESS OF MAKING ETHYL ALCOHOL FROM GALACTOSE.

No Drawing.    Application filed April 22, 1922. Serial No. 556,129.

(FILED UNDER THE ACT OF MARCH 3, 1883, 22 STAT. L., 625.)

*To all whom it may concern:*

Be it known that I, EARL C. SHERRARD, a citizen of the United States of America, and an employee of the Department of Agriculture, residing in Madison, Wisconsin (whose post-office address is Department of Agriculture, Madison, Wisconsin), have invented a new and useful Process of Making Ethyl Alcohol from Galactose.

This application is made under the act of March 3, 1883, chapter 143 (22 Stat. 625) and the invention herein described and claimed may be used by the Government of the United States, or any of its officers or employees in the prosecution of work for the Government and also by any person in the United States, either in public or private work, without payment to me of any royalty thereon.

My invention consists of converting galactose or a mixture of galactose and other sugars into ethyl alcohol by fermenting them with yeast under suitable conditions. The conditions essential to this conversion are an acidity of not more than fifty degrees, a temperature of 80 to 90° F., and in the presence of a yeast nutrient consisting of autolyzed yeast.

It is well known that galactose is a difficultly fermentable sugar when fermented under ordinary conditions. I have found that galactose obtained from western larch or other sources can readily be converted into alcohol by carefully regulating the temperature and acidity of the solution and by the proper choice of yeast nutrient. The following is an example of the way in which my invention can be performed but I do not limit myself to this example:

Galactose may be obtained from western larch by extracting the galactan with warm water and hydrolyzing it by boiling with dilute acid or by hydrolyzing the comminuted wood with dilute acid under steam pressure and extracting the sugars produced with water in which case the solution contains galactose in admixture with other sugars. The aqueous solution of galactose obtained by either method is then neutralized with a suitable neutralizing agent such as calcium carbonate or lime, if sulphuric acid is used, until it shows an acidity of not more than fifty degrees. Degrees acidity are understood to mean the number of cubic centimeters of tenth normal sodium hydroxide required to neutralize 100 cubic centimeters of the acid solution. If the solution of sugar is not sufficiently concentrated it should be evaporated until it contains about six to ten per cent total reducing sugar. To this solution of sugar is then added a sufficient quantity of a concentrated aqueous solution of autolyzed yeast to make the total solution correspond to a one to two per cent solution of dry autolyzed yeast and from five to eight per cent total reducing sugar. The solution of autolyzed yeast is prepared by boiling autolyzed yeast with water under a reflux condenser for about 4 hours. It should be made sufficiently concentrated so that too great a dilution of the sugar solution is avoided. After it is mixed with the sugar solution the whole is sterilized if necessary and after cooling to 80 to 90° F. inoculated with a pure culture of yeast. It is necessary to hold the temperature of the fermentation room at a temperature of 80 to 90° F. in order to insure a complete and rapid conversion. Should the acidity of the fermenting liquor increase to above 50 degrees acidity it should be lowered by the addition of a suitable neutralizing agent.

Having now described my invention what I claim is:

1. The process of making ethyl alcohol which comprises subjecting galactan-containing material to acid hydrolysis, forming a solution of the product, adjusting the acidity of this solution to not more than fifty degrees, seeding with yeast, producing fermentation and maintaining the acidity of the liquid at not to exceed fifty degrees during said fermentation.

2. The process of making ethyl alcohol which comprises subjecting galactan-containing material to acid hydrolysis, forming a solution of the product, adjusting the acidity of this solution to not more than fifty degrees, adding not more than 2 per cent autolyzed yeast, seeding with yeast, producing fermentation and maintaining the acidity of the liquid at not to exceed fifty degrees during said fermentation.

3. The process of making ethyl alcohol which comprises subjecting galactan-containing material to acid hydrolysis, forming a solution of the product, adjusting the acidity of this solution to not more than fifty degrees, adding not more than 2 per cent autolyzed yeast, seeding with yeast, maintaining the acidity at not to exceed fifty degrees, producing fermentation and holding the temperature between 80 and 90° F.

In testimony whereof, I affix my signature in the presence of two subscribing witnesses.

EARL C. SHERRARD.

Witnesses:
L. F. HAWLEY,
ERNEST BATEMAN.